Patented Aug. 14, 1951

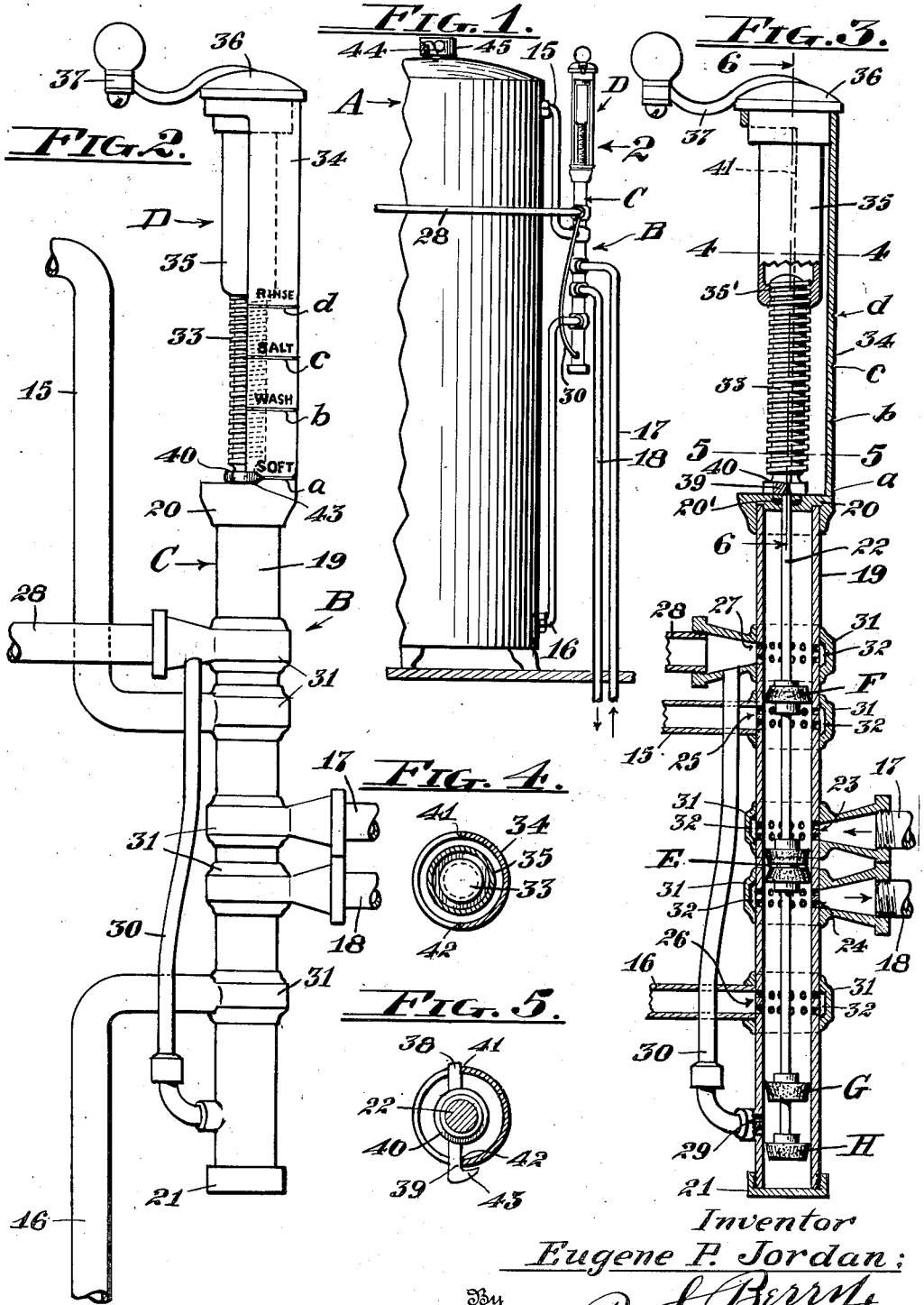

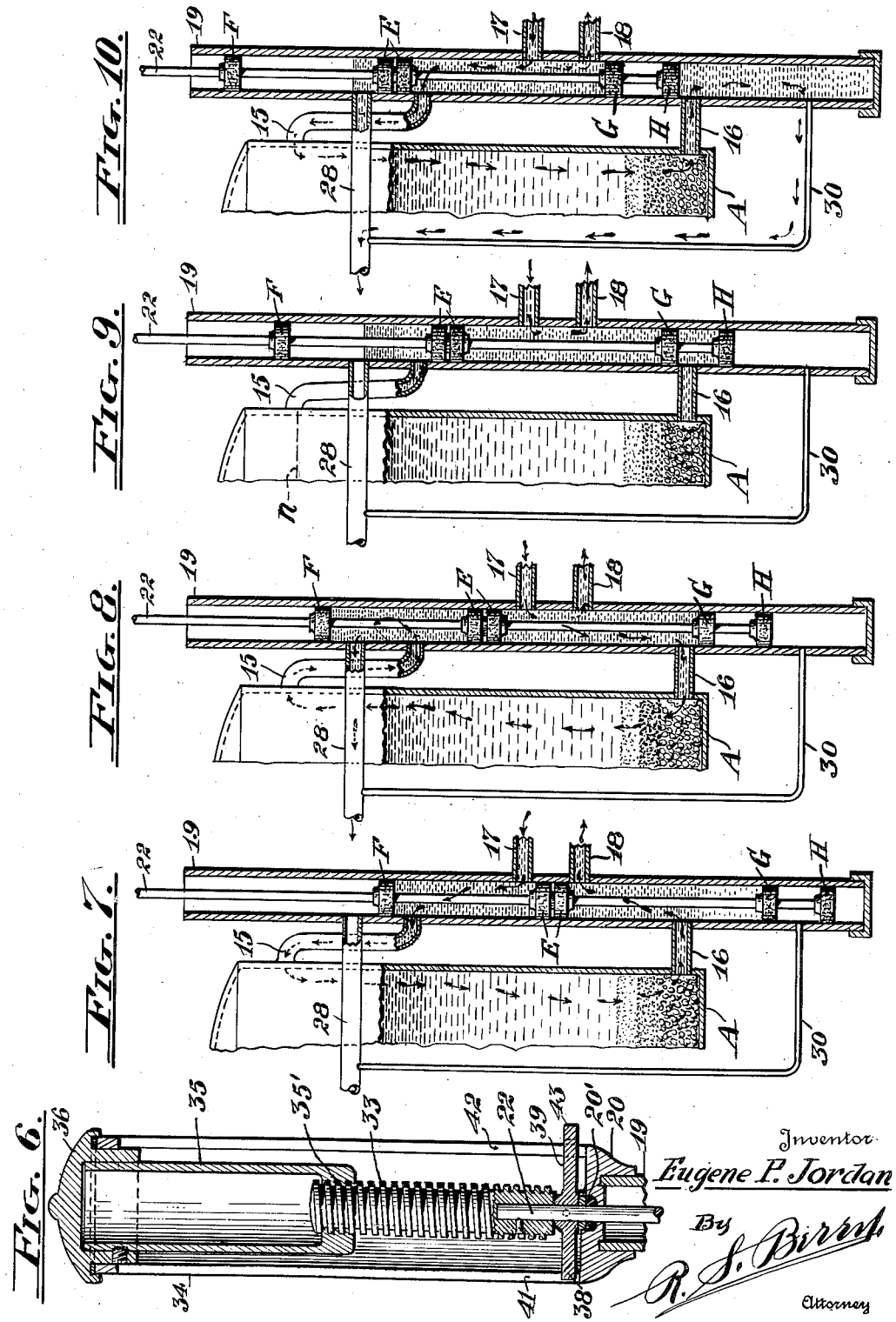

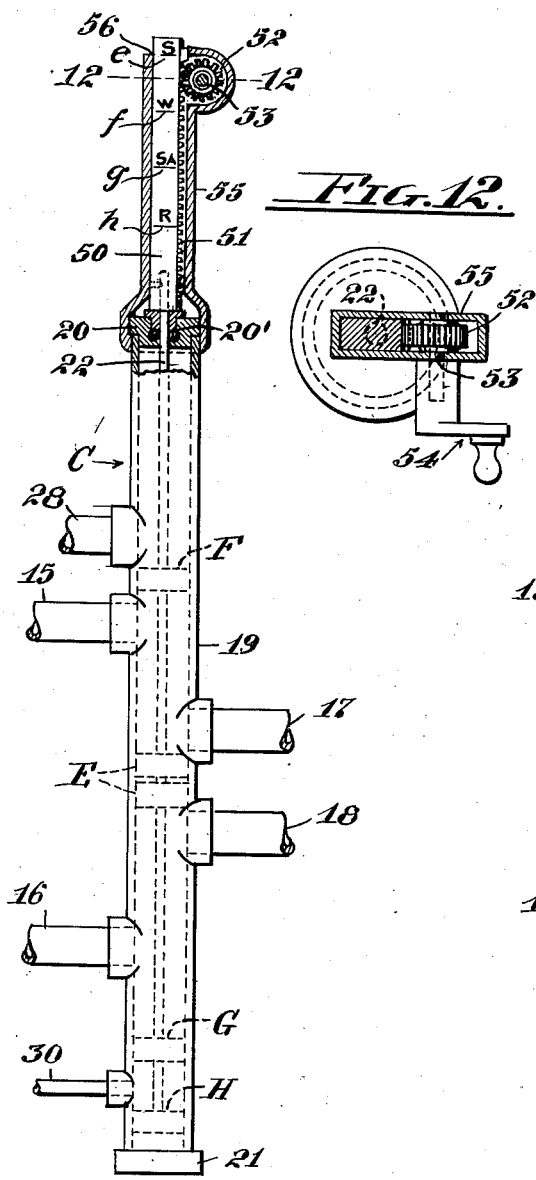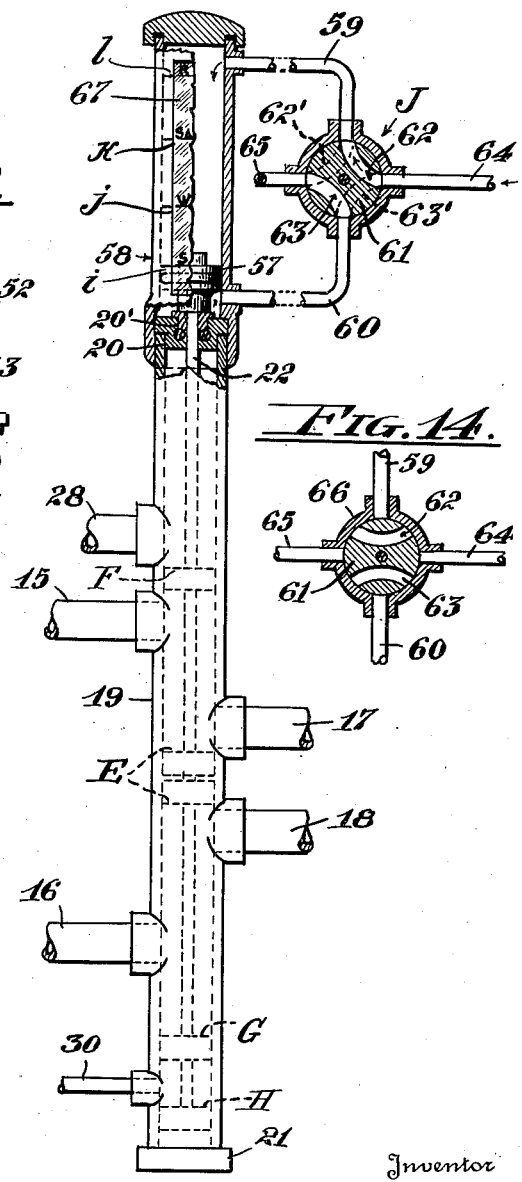

2,564,066

UNITED STATES PATENT OFFICE 2,564,066

MULTIPLE VALVE UNIT

Eugene P. Jordan, Los Angeles, Calif.

Application April 23, 1945, Serial No. 589,919

2 Claims. (Cl. 251—76)

This invention relates to a multiple valve unit and more particularly pertains to multiple valve structures of the piston valve type in which a plurality of valve elements are arranged on a single reciprocable stem and operable collectively to control the flow of fluid through a series of ports so arranged that when the valve assembly is disposed in various positions the fluid will be caused to flow in various courses.

The subject matter hereof is set forth in a companion application Ser. No. 628,431, filed November 14, 1945, now Patent No. 2,553,458 of May 15, 1951.

The primary object of the invention is to provide a valve structure of the above character which is especially applicable for use in controlling the flow of water through a reservoir containing a water treating element where it is desired to flow water from a source of supply through the reservoir in one direction during the treating operation then effect reconditioning of the treating element involving flowing the water through the reservoir in a reverse direction to effect a flushing action, cutting off the flow of water through the reservoir while subjecting the contents of the latter to the action of a chemical applied therein and thereafter directing the flow of water through the reservoir in a fashion to flush out the chemical.

Another object is to provide an arrangement in the valve structure whereby the flow of water through the reservoir during the chemical flushing action will be restricted relative to the normal flow of the water through the reservoir so as to then delay the flow of the water and prolong its solvent action on the chemical and consequently minimize the amount of water required to effect this flushing action.

Another object is to provide an arrangement in the valve structure whereby the flow of water from the source to a service line through the valve unit will be uninterrupted irrespective of various positions of the several valve elements.

Another object is to provide a means for effecting movement of the valve elements to their various positions in a consecutive order by the operation of a single actuator so as to obviate selective operations ordinarily employed in water treating apparatus.

Another object is to provide a multiple valve unit of the above character in which balanced pressures are maintained on opposite sides of such of the several valve elements as are subjected to water pressure from the source so as to obviate any tendency of the valve elements to shift under the water pressure from any of the adjusted positions and also to minimize resistance to operational adjustment of the valve.

A further object is to provide a multiple valve unit of the character above referred to which is simple in construction and operation, which may be readily assembled and economically produced, which is highly durable and which is dependable in performance.

With the foregoing objects in view, together with such other objects and advantages as may subsequently appear, the invention resides in the parts and in the combination, construction and arrangement of parts hereinafter described and claimed, and illustrated by way of example in the accompanying drawings; in which:

Fig. 1 is a view in elevation of a fragmentary portion of the water treating reservoir showing the invention as applied;

Fig. 2 is a view in side elevation of the multiple valve unit as seen in the direction indicated by the arrow 2 in Fig. 1;

Fig. 3 is a view of the unit shown in Fig. 2 as seen in vertical section with parts in elevation;

Fig. 4 is a detail horizontal section taken on the line 4—4 of Fig. 3;

Fig. 5 is a view in horizontal section taken on the line 5—5 of Fig. 3;

Fig. 6 is a detail in vertical section and elevation taken on the line 6—6 of Fig. 3;

Fig. 7 is a diagrammatic sectional view showing the position of the valve elements in directing the flow of water through a reservoir during the water treating operation;

Fig. 8 is a similar view showing the valve unit as positioned in effecting reverse flow of water through the reservoir and to waste in effecting an initial flushing action;

Fig. 9 is a similar view showing the valve element as positioned to prevent the flow of water to or from the reservoir;

Fig. 10 is a diagram illustrating the position of the valve element in directing the flow of water through the reservoir and to discharge through a restricted outlet in effecting flushing of dissolved chemicals from the reservoir;

Fig. 11 is a view in section and elevation illustrating a modified form of the valve actuating mechanism;

Fig. 12 is an enlarged section and plan view taken on the line 12—12 of Fig. 11;

Fig. 13 is a view in elevation partly in section depicting another modified form of the valve actuating mechanism with a control valve shown diagrammatically;

Fig. 14 is a diagram of the control valve depicted in Fig. 13 showing the valve in a closed position.

Referring to the drawings more specifically A indicates a water treating reservoir containing a conventional water treating element such as a filter or filtering material usually consisting of gravel, sand, crystals, or the like, adapted to effect filtration and softening of water flowed through the reservoir. The tank is fitted with an inlet pipe 15 leading into the upper portion thereof and an outlet pipe 16 leading from the lower portion thereof.

The present invention is embodied in a multiple valve unit B including a valve housing C and an actuator D, which unit is interposed between the pipes 15 and 16 and a pair of pipes 17 and 18 constituting respectively a supply pipe and a service pipe. In order to facilitate description of the valve it will be referred to as occupying a vertical position in which it is ordinarily mounted, although it will be understood that the valve will function equally well in a horizontal or inclined position.

The valve housing C consists of an upright elongated cylindrical tube 19 the upper and lower ends of which are closed by caps 20 and 21 respectively. Arranged in the housing C for longitudinal reciprocal movement therein is a rod 22 on which is fixedly mounted a series of spaced piston valve elements which slidably contact the inner surface of the tube 19 and partition the latter into a plurality of chambers. The valve elements are here shown as embodying a valve element E interposed between spaced valve elements F and G arranged respectively in the upper and lower portions of the tubular valve housing. A fourth valve element H is mounted on the valve rod 22 adjacent to but spaced below the valve element G. The several valve elements each preferably comprises a conventional cup-leather piston embodying a flexible resilient tapered or frusto conical side wall which contacts the inner surface of the tube in such fashion as to afford a seal against passage of liquid past the element in one direction, but which by reason of the flexible character of the cup-leather permits liquid to flow past the valve element in the opposite direction. The valve element E comprises a pair of such cup-leather pistons arranged face to face with the flexible side walls of the cup-leathers diverging outwardly relative to each other so as to afford an effective seal against the flow of liquid past the element E in either direction.

The cup-leather of the valve element F is arranged with its side walls diverging outwardly and downwardly so as to seal off liquid from passing upwardly around the valve element yet permit the passage of liquid downwardly past the valve element when it is moved upwardly against entrapped liquid in the upper portion of the valve housing.

The cup-leathers of the valve elements G and H at the lower end of the valve housing are arranged with their side walls diverging upwardly so as to permit the flow of liquid around the valve elements on moving these elements downwardly against liquid entrapped in the lower end portion of the valve housing C.

The pipes 17 and 18 connect with the valve housing C intermediate the ends thereof and open to the interior of the tube 19 through ports 23 and 24 arranged respectively immediately above and below the valve element E when the latter is in its normal lowermost position and in which position the valve element E serves to close communication between the pipes 17 and 18 through the tube 19. The pipe 17 leads from any suitable source of water supply under pressure such as water supply mains, while the pipe 18 leads to service outlets such as faucets, plumbing fixtures, and the like.

The inlet pipe 15 of the tank A connects with the valve housing C and opens to the interior thereof through ports 25 located immediately below the valve element F when the latter is in its lowermost position, while the reservoir outlet pipe 16 connects with the valve housing C and opens to the interior thereof through ports 26 arranged in upwardly spaced relation to the valve element G.

Formed in the valve housing C at a point above the valve element F when the latter is in its lowermost position are ports 27 opening to an open drain pipe 28 leading to a suitable point of waste discharge and formed in the lower portion of the valve housing C at a point intermediate the valve elements G and H when such elements are in their lowermost position is a port 29 opening to a pipe 30 leading to the waste pipe 28. The pipe 30 is of an inside diameter less than that of the waste pipe 28 and accordingly affords a restricted flow of fluid therethrough to waste from the port 29 relative to the flow of fluid to waste through ports 27.

In order to permit unrestricted flow of water through the connections between the valve housing C and pipes 15, 16, 17, 18 and 28, said pipes are coupled to sleeves 31 which surround the tube 19 and enclose channels 32 which extend circumferentially around the tube which is formed with a series of small perforations opening to the channels 32 and collectively constituting the several inlet and outlet ports controlled by the valve elements, the collective areas of a group of the perforations exceeding the cross sectional area of the associated pipe. The groups of small perforations constituting the ports are primarily provided for the purpose of permitting ready passage of the piston valve elements thereover without mutilation of the valve cup-leathers.

The port 29 serves as a restricted outlet and is dimensioned to have much smaller area than the other valve ports.

The valve rod 22 slidably extends through a conventional packing gland 20' carried by the cap 20 which gland serves to prevent leakage from the valve housing around the rod.

The actuator D in its preferred embodiment includes a screw 33 extending in axial alignment with the upper end of the rod 22 to which the latter is secured; the screw extending from adjacent the cap 20 within a shell 34 carried by the latter. The screw 33 has threaded engagement with a rotary sleeve 35 extending in axial alignment therewith, the lower end of the sleeve being internally threaded as indicated at 35' to engage the screw 33. The upper end of the sleeve 35 is secured to a cap 36 journalled in the outer upper end of the sleeve 34 as particularly shown in Fig. 6. The cap 36 is fitted with a handle 37 by which it may be manually rotated to effect turning of the sleeve 35 so as to cause the screw to feed lengthwise in or out of the sleeve and thereby impart longitudinal movement to the screw 33 and the attached valve rod 22 with its associated valve elements; the screw 33 being held against rotation by means of fingers 38 and 39 protruding from opposite sides of a collar 40 affixed to the rod 22 adjacent the lower end of the screw 33 which fingers 38 and 39 slidably abut opposed parallel margins 41 and 42 formed on the shell 34 and extending longitudinally thereof in parallel relation to the axis of the screw 33. The outer end of the finger 39 is formed with a pointer 43 which overlies the outer face of the shell 34 for cooperation with a series of vertically spaced designated marks a, b, c and d to form an indicator whereby the position of the valve elements relative to the several ports may be determined.

As shown in Fig. 2 the lower line a bears indicia "Soft" and is so related to the arrangement of the valve elements that when the pointer 43 designates the line a the valve elements will be in their lowermost position as shown in Figs. 3 and 7 in which position water is directed downwardly through the reservoir in the treating operation. The line b is designated by the indicia "Wash" and is so positioned relative to the valve elements and their associated ports that when the valve elements are moved upwardly such distance that the pointer 43 will indicate the line b the parts will be disposed as shown in Fig. 8 so as to direct reverse flow of water through the reservoir and to waste in effecting a flushing action on the water treating element. The line c is designated by the indicia "Salt" and is so positioned relative to the valve elements and their associated ports that when the valve elements are elevated to a position where the pointer 43 indicates the line c the parts will be disposed as shown in Fig. 9 and such as to prevent the flow of water through the reservoir so that the water confined in the latter will be static and thus permit the application to the reservoir of the chemical, such as salt, employed in reconditioning the treating element.

The uppermost line d is designated by the indicia "Rinse" and is so related to the valve elements that when the latter are disposed in their uppermost position as shown in Fig. 10 the arrow 43 will indicate the line d. When the valve elements are in this position the flow of water will be directed downwardly through the reservoir and then to waste through the restricted port 29 and pipe 30.

In the operation of the valve structure just described, the valve elements on being disposed in their lowermost position as shown in Figs. 3 and 7, water will flow from the main supply pipe 17 into the chamber within the valve housing extending between the valve elements E and F and then flow through the pipe 15 to the upper portion of the reservoir A and downwardly through water treating elements in the latter and through the discharge pipe 16 into the chamber formed in the valve housing between the valve elements E and G from which water is directed to suitable points of discharge through the service pipe 18.

When it is desired to flush the reservoir the valve elements are moved upwardly by rotating the sleeve 35 as by use of the handle 37 so as to cause the screw 33 to move upwardly in its threaded connection with the sleeve, which movement is continued until the pointer 43 designates the line b whereupon on arresting movement of the valve elements they will be disposed as shown in Fig. 8 with the valve element E positioned above the inlet port 23 of the water supply pipe 17 and with the upper valve element F disposed above port 27 leading to the overflow pipe 28. The valve element E will then be immediately below the port 26 opening to the pipe 16. When the parts are thus disposed water will flow in the direction indicated by the arrows in Fig. 8, namely, from the intake pipe 17 downwardly through the valve housing into the lower end of the reservoir A through the pipe 16 then upwardly through the reservoir and the filter element therein out through the pipe 15 into the chamber in the valve housing between the valve elements E and F then to discharge through ports 27 and pipe 28.

When it is desired to prevent the flow of water to and from the reservoir the valve elements are disposed in the position shown in Fig. 9 by operating the actuator handle 37 until the pointer 43 indicates the line c. The valve elements E and G will then be disposed intermediate the reservoir inlet and outlet pipes 14 and 16 and on opposite sides of the ports communicating with the supply pipe 17 and the service. When the valve elements are disposed in this position the flow of water through the reservoir from the supply pipe 17 will be inhibited. In accordance with the usual practice in effecting reconditioning of the water treated element in the reservoir A, a quantity of salt is delivered to the interior of the reservoir as through an opening 44 in the top of the reservoir normally closed by a removable cap 45.

It is necessary to flush the resultant brine from the reservoir, which is effected in the present instance by operating the actuator handle 37 to move the screw 33 to dispose the arrow 43 in register with the line d where the valve elements will be disposed in their uppermost position as shown in Fig. 10. The valve element F will then be positioned intermediate the ports communicating with the pipes 15 and 28 so as to cut off communication between the upper portion of the valve housing and the waste pipe 28 and at the same time open communication between the water supply pipe 17 through the valve housing and pipe 15 to the upper portion of the reservoir.

The valves G and H will then be disposed between the ports communicating with the pipes 16 and 18 so as to open the discharge pipe 16 and the lower end of the reservoir to the lower end portion of the valve housing so that water from the reservoir will pass to discharge through the port 29, pipe 30 and waste pipe 28 as indicated by the arrows, in Fig. 10. This flow of the water to discharge will be retarded or restricted relative to the normal flow of water through the reservoir, by reason of the restriction afforded by the reduced port 29 as and for the purpose before stated.

After the desired flushing action has been affected and it is desired to restore the apparatus to the water treating condition the valve elements are returned to their normal lowermost position by reversing the direction of rotation of the handle 37 and the threaded sleeve 35 to move the screw 33 and its associated parts downwardly to the position where the pointer 43 will indicate the lower line a.

An important feature of the invention resides in the arrangement of the valve elements E intermediate the valve elements F and G and their arrangement relative to the ports 23 and 24 communicating with the supply pipe 17 and service pipe 18 so as to afford the several communications at each of the several adjusted positions of the valve elements, and whereby the flow of water will be maintained from the supply pipe 17 on opening outlets to which the service line leads irrespective of any position assumed by the valve elements as to any of the adjusted positions illustrated in Figs. 7 to 10. The flowing bodies of water in the valve housing are indicated by dotted lines in Figs. 7 to 10 and the directions of flow are designated by arrows.

In Figs. 11 to 14 inclusive showing modified forms of the valve actuator, parts corresponding to those shown in the preceding figures are designated by corresponding reference numerals; these parts being those of the valve structure per se including the valve housing and the valve assembly.

In the modified form of the valve actuator shown in Figs. 11 and 12 the upper end of the valve rod 22 is connected to a slide bar 50 formed on one edge thereof with rack teeth 51 with which latter is engaged a pinion 52 on a shaft 53 fitted with a crank 54. The shaft 53 is journalled in the upper end portion of a housing 55 which encompasses the pinion 52 and the slide bar 50 and forms a guide for the latter. The slide bar projects through an opening 56 in the upper end of the housing 55 and formed on the slide bar are markings e, f, g and h suitably designated to indicate the several adjusted positions of the valve element. The housing 55 is carried by and affixed to the upper end of the valve housing C.

In the operation of the form of the actuator above described rotation of the pinion 52 through the medium of the shaft 53 and crank 54 will effect longitudinal movement of the slide bar 50 and its connected valve parts to the rod 22.

The positioning of the valve element will be indicated by the alignment of the lines e, f, g and h on the bar 50 with the margin of the opening 56; the uppermost line e when aligned with the margin of the opening 56 denoting that the valve structure is in the water treating position, the line f when aligned with the margin of the opening 56 indicating that the valves are in their initial back-washing position, the line g when aligned with the margin of the opening 56 designating the positioning of the valves to cut off flow of water and from the reservoir, and the line h when aligned with the margin of the opening 56 denoting that the valves are disposed in the chemical rinsing position.

In the modified form of the actuator shown in Figs. 13 and 14 the upper end of the valve rod 22 is connected to a piston 57 disposed in an enclosed cylinder 58 and adapted to be operated hydraulically to effect reciprocation of the valve assembly by directing liquid under pressure to either side of the piston 57 according to the desired direction of movement of the latter and exhausting liquid from the side of the piston opposite that to which the liquid under pressure is admitted.

As a means for effecting directional flow of liquid to and from the cylinder 58 from opposite sides of the piston 57, conduits 59 and 60 are provided connecting with upper and lower portions of the cylinder 58 and opening to the interior thereof on opposite sides of the piston 57 which conduits lead to a control valve J embodying a rotary valve element 61 formed with passages 62 and 63 adapted to be placed in communication with either of the conduits 59 or 60 and with a fluid supply pipe 64 and an exhaust pipe 65 leading through the valve housing 66; the passage 62 being adapted to effect communication between the pipes 64 and 59 when the valve member is in one position as indicated in full lines in Fig. 13, and to effect communication between the pipe 59 and the exhaust pipe 65 as indicated by the dotted line 62' when the valve is in another position. In like fashion the passage 63 will afford a communication between the pipes 60 and 65 when the passage 62 connects the pipes 64 and 69 as shown in full lines in Fig. 13, and affords communication between the pipes 64 and 60 as indicated by the dotted lines 63' in Fig. 13 when the passage 62 communicates with pipes 59 and 65. The passages 62 and 63 are also adapted to be positioned with their ends sealed by the valve housing 66 as shown in Fig. 14 with intermediate portions of the valve member closing the contiguous ends of the pipes 59, 60, 64 and 65 so as to cut off flow of liquid to and from the cylinder 58 and thereby maintain the piston 57 in a stationary position by liquid entrapped on opposite sides thereof.

As a means for indicating the positions of the valve elements in the valve housing C the piston cylinder 58 is provided with a transparent panel 67 extending lengthwise thereof throughout the length of travel of the piston 57 and through which the position of the piston may be observed. Designated lines i, j, k and l are provided on the panel 67 or on the cylinder at an edge of the panel which lines are arranged so that when the upper edge of the piston is in alignment with any one of the lines such will indicate that the valve assembly is disposed in the particular position so indicated.

In applying the valve unit to the reservoir A it is preferably arranged in the vertical position shown in Fig. 1 and is disposed so that the waste pipe 28 and its connection with the valve housing will be positioned on a plane spaced below the point of connection of the inlet pipe 15 with the upper portion of the reservoir, whereby when the valve elements are positioned as shown in Fig. 9 to shut off the flow of water to the reservoir from the supply pipe 17, a quantity of water entrapped in the reservoir will drain therefrom to the level of the lower marginal portion of the opening in the reservoir with which the pipe 15 connects, as indicated by the broken lines n in Fig. 9. This provides a space in the upper portion of the reservoir for the reception of a quantity of salt the addition of which to the reservoir will occasion displacement of water therein. By placing the waste pipe 28 in connection with the valve housing below the plane of the connection between the pipe 15 and the reservoir, water displaced by the addition of the salt will flow through the pipe 15 into the space above the valve element E and then to discharge through the waste pipe 28.

While I have shown and described a specific construction and arrangement of the valve unit and have set forth several forms of the valve actuator, I do not limit myself thereby to the particular recited constructions and the invention embraces such other adaptations as come within the meaning and scope of the appended claims. For example, while I have referred to the valve elements as embodying cut-leathers, such are not necessarily formed of leather but may be made of rubber or rubber-like compositions or any other suitable material.

It will be apparent that while the dimensioning of the port 29 has been described as a means for restricting the flow of the water from the lower end portion of the valve unit to waste, that such restriction may be afforded in any other conventional way, such as reduction in the size of the pipe 30 or its outlet or by the interposition of a restrictor valve therein.

Furthermore, while the invention has been set forth as applied to a water treating apparatus for which it is especially adapted it is manifest that the valve structure and its actuator may be employed in various other apparatus and put to various other uses to which it is adaptable.

I claim:

1. In a multiple valve unit including an elongated tubular housing having a supply inlet and a service outlet intermediate its ends and spaced apart lengthwise thereof, and also having a pair of longitudinally spaced ports adjacent each end thereof, a longitudinally reciprocable valve rod extending lengthwise in said housing, a piston valve element fixed on said rod and normally disposed intermediate said inlet and outlet, a valve element fixed on said rod normally disposed intermediate the ports of one of said pairs of ports, a valve element fixed on said rod normally disposed between the ports of said other of said pairs of ports, a valve element fixed on said rod normally disposed on the outer side of the outermost port of said last named pair of ports, and actuator means for reciprocating said valve rod to shift the positions of the valve elements thereon relative to said inlet and outlet and to said ports; an open waste pipe leading from the port adjacent one end of the housing, and a pipe leading from the port adjacent the other end of the housing connecting with said waste pipe having a reduced diameter relative to said waste pipe.

2. A multiple valve unit comprising an elongated tubular housing having a supply inlet and a service outlet intermediate its ends and spaced apart lengthwise thereof, a waste outlet adjacent each end of said housing, a port in said housing intermediate said inlet and one of said waste outlets, a port in said housing intermediate said outlet and the other of said waste outlets, a reciprocable valve assembly in said housing including a valve element normally disposed between said supply inlet and service outlet, a valve element normally disposed between each of the waste outlets and the adjacent intermediate port, a valve element adjacent one of the last named valve elements spaced outwardly relative thereto to be normally positioned on the side of the waste outlet opposite said last named valve element, whereby said waste outlet is normally located intermediate a pair of valve elements, and means for actuating said valve assembly to vary the position of said valve elements relative to said inlet and service outlet and to said ports and waste outlets, said last named waste outlet being restrictive relative to the other waste outlet.

EUGENE P. JORDAN.

REFERENCES CITED

The following references are of record in the file of this patent:

UNITED STATES PATENTS

| Number | Name | Date |
| --- | --- | --- |
| 391,597 | Ellithorpe | Oct. 23, 1888 |
| 599,466 | Bates | Feb. 22, 1898 |
| 763,123 | Stahl | June 21, 1904 |
| 789,026 | Huston | May 2, 1905 |
| 1,211,830 | Earl | Jan. 9, 1917 |
| 1,605,026 | Hill | Nov. 2, 1926 |
| 1,707,692 | Ter Beest | Apr. 2, 1929 |
| 2,011,329 | Wayer | Aug. 13, 1935 |
| 2,012,065 | Haas | Aug. 20, 1935 |
| 2,042,186 | Petersen | May 26, 1936 |
| 2,132,030 | Hunt | Oct. 4, 1938 |
| 2,205,788 | Camerota | June 25, 1940 |
| 2,210,555 | Podolsky | Aug. 6, 1940 |
| 2,372,684 | Roth | Apr. 3, 1945 |